United States Patent
Snyder et al.

(10) Patent No.: US 11,811,063 B2
(45) Date of Patent: Nov. 7, 2023

(54) CATHODE FOR SOLID-STATE ELECTROCHEMICAL CELL HAVING ELEMENTAL DOPANT IN GRAIN BOUNDARIES

(71) Applicant: Apple Inc., Cupertino, CA (US)

(72) Inventors: Shawn William Snyder, Santa Clara, CA (US); Terry Tiegs, Lenoir City, TN (US); Jeffrey J. Kelly, Santa Clara, CA (US); Damon E. Lytle, Cupertino, CA (US); Bernd Jurgen Neudecker, Los Gatos, CA (US); Jianer Bao, Sunnyvale, CA (US); Mona Shirpour, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 247 days.

(21) Appl. No.: 17/108,363

(22) Filed: Dec. 1, 2020

(65) Prior Publication Data

US 2021/0234170 A1    Jul. 29, 2021

Related U.S. Application Data

(60) Provisional application No. 62/966,134, filed on Jan. 27, 2020.

(51) Int. Cl.
| | |
|---|---|
| H01M 4/62 | (2006.01) |
| H01M 10/052 | (2010.01) |
| H01M 4/136 | (2010.01) |
| H01M 4/38 | (2006.01) |
| H01M 4/131 | (2010.01) |
| H01M 4/485 | (2010.01) |
| H01M 4/58 | (2010.01) |

(52) U.S. Cl.
CPC ............ *H01M 4/62* (2013.01); *H01M 4/131* (2013.01); *H01M 4/136* (2013.01); *H01M 4/382* (2013.01); *H01M 4/485* (2013.01); *H01M 4/5825* (2013.01); *H01M 10/052* (2013.01)

(58) Field of Classification Search
CPC ......... H01M 10/052; H01M 2004/028; H01M 4/131; H01M 4/136; H01M 4/382; H01M 4/485; H01M 4/58; H01M 4/5825; H01M 4/62; Y02E 60/10
See application file for complete search history.

(56) References Cited

U.S. PATENT DOCUMENTS

| | | |
|---|---|---|
| 9,786,905 B2 | 10/2017 | Holme et al. |
| 9,917,295 B2 | 3/2018 | Elam et al. |
| 2011/0287296 A1 | 11/2011 | Sabi et al. |

(Continued)

FOREIGN PATENT DOCUMENTS

| | | |
|---|---|---|
| WO | 2019078897 A1 | 4/2019 |
| WO | 2019094359 A1 | 5/2019 |

*Primary Examiner* — Sarah A. Slifka
(74) *Attorney, Agent, or Firm* — Young Basile Hanlon & MacFarlane, P.C.

(57) ABSTRACT

A solid-state cathode for a solid-state electrochemical cell includes an electrochemically active cathode material and one or more elemental dopant residing in grain boundaries of the electrochemically active cathode material. The grain boundaries contain at least 0.2 wt % of the one or more elemental dopant and the one or more elemental dopant is less than 10 wt % of the solid-state cathode. The solid-state cathode does not have liquid, gel and polymer materials.

16 Claims, 2 Drawing Sheets

(56) References Cited

U.S. PATENT DOCUMENTS

| | | | |
|---|---|---|---|
| 2012/0129048 A1* | 5/2012 | Fukui | C08G 73/1067 |
| | | | 252/500 |
| 2014/0147740 A1* | 5/2014 | Kokubu | H01M 4/366 |
| | | | 429/188 |
| 2014/0178602 A1 | 6/2014 | Angelini et al. | |
| 2017/0179472 A1* | 6/2017 | Allie | H01M 4/1391 |
| 2018/0287209 A1 | 10/2018 | Hasegawa et al. | |
| 2018/0316005 A1* | 11/2018 | Shin | H01M 4/0471 |
| 2019/0181432 A1 | 6/2019 | Yui et al. | |
| 2019/0214629 A1 | 7/2019 | Andre et al. | |
| 2019/0280330 A1 | 9/2019 | Albano | |
| 2019/0372109 A1* | 12/2019 | Moon | H01M 4/382 |

* cited by examiner

CATHODE FOR SOLID-STATE ELECTROCHEMICAL CELL HAVING ELEMENTAL DOPANT IN GRAIN BOUNDARIES

CROSS-REFERENCE TO RELATED APPLICATION

This application claims priority to and the benefit of U.S. Provisional Application Patent Ser. No. 62/966,134, filed Jan. 27, 2020, the entire disclosure of which is hereby incorporated by reference.

TECHNICAL FIELD

This disclosure relates to a cathode for solid-state electrochemical cells, the cathode including an elemental dopant in grain boundaries.

BACKGROUND

Solid-state electrochemical cells employ cathodes to release and store cations during charge and discharge operations, respectively. Such cathodes can include transition metal oxides and phosphates, which are commonly used to exchange lithium cations with an electrolyte. A challenge in producing cathodes for solid-state electrochemical cells is promoting faster diffusion within the solid-state cathode material, which has no liquids or plastics. Typical attempts to promote faster diffusion in a solid-state cathode include adding ion diffusing materials in with the cathode material. However, these ion diffusing materials can react negatively with the cathode material in operation and may decrease the electrochemical or chemical performance of the cell so that it underperforms for practical applications.

SUMMARY

Disclosed herein are implementations of a solid-state cathode for a solid-state electrochemical cell. A solid-state cathode for a solid-state electrochemical cell as disclosed herein comprises an electrochemically active cathode material and one or more elemental dopant residing in grain boundaries of the electrochemically active cathode material, and the solid-state cathode does not have liquid, gel and polymer materials.

In the solid-state cathode, the one or more elemental dopant is selected from the group consisting of Zr, Y, Sc, Si, Ti, La, Hf, Nb, Ta, Mo, W, B, Mn, Al, Mg, Cl and F.

In some embodiments of the solid-state cathode, the grain boundaries of the electrochemically active material contain at least 0.2 wt % of the one or more elemental dopant and the one or more elemental dopant is less than 10 wt % of the solid-state cathode.

In some embodiments of the solid-state cathode, the grain boundaries contain at least 0.2 wt % of the one or more elemental dopant and the one or more elemental dopant is less than 1.0 wt % of the solid-state cathode.

In the solid-state cathode, the electrochemically active cathode material comprises one or more lithium transition metal-based particles selected from lithium transition metal oxides and lithium transition metal phosphates.

In some embodiments, the solid-state cathode is greater than or equal to 85% dense.

In some embodiments, the solid-state cathode is greater than or equal to 90% pure.

In some embodiments of the solid-state cathode, the one or more elemental dopant resides in the grain boundaries and a triple junction and is not in the bulk electrochemically active material.

In some embodiments of the solid-state cathode, the electrochemically active cathode material is LCO and the one or more elemental dopant is Zr.

Also disclosed are solid-state electrochemical cells comprising the solid-state cathodes disclosed herein, also having a solid-state anode and a solid-state electrolyte. Solid-state electrochemical devices can have one or more solid-state electrochemical cells.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features may be arbitrarily expanded or reduced for clarity.

DETAILED DESCRIPTION

Figure 1:
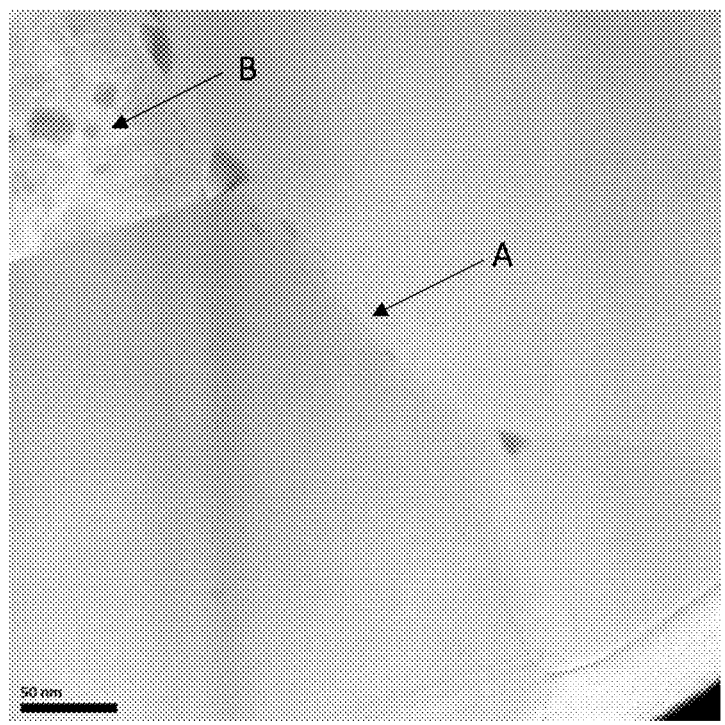
FIG. 1 is a STEM image of a solid-state cathode as disclosed herein.

Solid-state electrochemically active cathode materials, whether in pure form (for instance commercially available $LiCoO_2$) or composite form (more than one electrochemically active material), may not provide a sufficiently high lithium ion diffusion for practical cathode performance. Practical cathode performance for both pure cathodes and composite cathodes requires, in part, a high, effective diffusion coefficient inside the cathode. A high, effective diffusion coefficient of the cathode material allows for, upon cell discharge, as many electrochemically active species as possible to be inserted into the cathode in the shortest time possible and into cathode locations that are farthest away from the cathode-electrolyte interface. Known attempts to increase the effective diffusion coefficient inside the cathode includes adding an additional ion diffusing material to the electrochemically active cathode material, which can negatively impact the performance of the cell due to negative reactions between materials, a reduction in the mass of the electrochemically active cathode material, an increase in the thickness of the solid-state cathode, or a decrease in the mechanical strength of the solid-state cathode, as examples.

The solid-state cathode disclosed herein is incorporated into an all solid-state electrochemical cell that does not contain any liquid, plastic, or gel components. Gel components comprise, for example, solvents that have viscosities so high they do not flow like a common liquid.

The solid-state cathode for solid-state electrochemical cells disclosed herein utilizes particular elemental dopants added to the precursors of the electrochemically active cathode material that, after sintering, are concentrated in the grain boundaries of the electrochemically active cathode material and promote beneficial properties between the individual grains of the electrochemically active cathode material, one of these beneficial properties being improved ion diffusion. Fast ionic grain boundary conduction, improved with the metal dopants, provides ions to and from the locations of the electrochemical reactions responsible for capacity and energy storage, which are inside the grain bulk.

In addition to the improved ion diffusion, the solid-state cathode for solid-state electrochemical cells disclosed herein also improves bonding strength during manufacturing that results in a more durable ceramic cathode with improved capacity retention during cycling. The solid-state cathode for solid-state electrochemical cells disclosed herein also promotes a reduction in electrochemically active cathode material grain growth during sintering, enhancing the process stability, the cathode durability and the ion diffusivity. Small grain sizes of the active cathode material are conducive to shortening the migration paths of lithium ions during the lithiation/delithiation process and as a result, improve the electrochemical performance.

The solid-state cathode disclosed herein is a durable, highly dense, free-standing wafer of homogenous, highly pure cathode material with fine, randomly-oriented grains that has intrinsic ion and electron carrying capabilities. As used herein, "highly dense" means greater than or equal to 85% dense. As used herein, "highly pure" means greater than or equal to 90% pure. As used herein, "fine" means less than 2 μm. The disclosed wafer would receive metallization and a solid-state electrolyte with a subsequent metallic lithium or other anode material coating.

The solid-state cathodes for a solid-state electrochemical cell disclosed herein comprise an electrochemically active cathode material and elemental dopant residing in grain boundaries of the electrochemically active cathode material. The grain boundaries, which may be between about 10 nm and 40 nm in width, contain at least 0.2 wt % of the elemental dopant, while the cathode as a whole has 10 wt % or less of the elemental dopant, and in some embodiments, 1 wt % or less. The solid-state cathode contains no liquid, gel, plastic, or polymer material, including any liquid, gel, or polymer electrolytes.

The elemental dopant in the solid-state cathode can be one or more than one dopant selected from the group consisting of Zr, Y, Sc, Si, Ti, La, Hf, Nb, Ta, Mo, W, B, Mn, Al, Mg, Cl and F. These elements as additives to the electrochemically active cathode material promote mechanical robustness and increase ion diffusion, promoting electrical performance. The elemental dopants influence grain growth, promoting an increase in defected grain boundaries, which are ion diffusion enhancing structures.

The electrochemically active cathode material can comprise one or more lithium transition metal-based material selected from lithium transition metal oxides and lithium transition metal phosphates. The lithium transition metal-based material may be an intercalation lithium ion compound such as lithium transition metal oxides having a general formula of $LiMO_2$ and $LiM_xO_y$, and lithium transition metal phosphates, having the general formula of $LiMPO_4$, wherein M is one or more transitional metal cations. The lithium transition metal-based material can include, as non-limiting examples, layered-type materials, such as $LiCoO_2$, $LiNi_{1/3}Mn_{1/3}Co_{1/3}O_2$ and $LiNi_{0.8}Co_{0.15}Al_{0.05}O_2$; olivine-type materials, such as $LiFePO_4$; spinel-type materials, such as $LiMn_2O_4$; and other similar materials.

To provide the chemical foundation for incorporation of the elemental dopant into the structural grain interfaces, direct supply of the solid-state precursor materials and the elemental dopant can be used. An inert environment is used to promote the chemical reactions that grow and bond, avoiding oxidation and material loss. Oxygen annealing is carried out to carefully redistribute the lithium ions or oxygen that may have been displaced during the inert processing.

Another approach to produce the solid-state cathode is carbon decomposition. The carbon skin reacts with the electrochemically active cathode material to form solid-state precursors of the electrochemically active cathode materials. The elemental dopant incorporates into the structure between the grains using an inert environment to promote the chemical reactions during sintering. Oxygen annealing is carried out to carefully redistribute the lithium ions or oxygen that may have been displaced during the inert processing.

Figure 2:
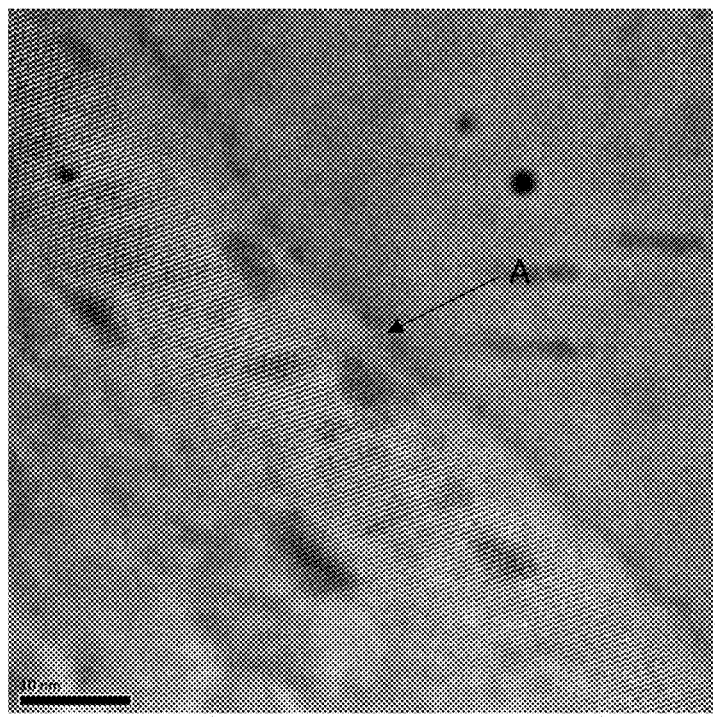
FIG. 2 is a STEM image of a solid-state cathode as disclosed herein.

FIGS. 1 and 2 are STEM images of a solid-state cathode as disclosed herein. The electrochemically active material of the solid-state cathode is LCO and the elemental dopant is Zr. The arrows A in FIGS. 1 and 2 point to a grain boundary between grains of LCO, and arrow B points to the triple junction. The Zr is seen in the intergranular phase between the grains. Zr is also found in nano-sized grains of Zr—Co—Li—O in the triple junction.

The all solid-state electrochemical cell incorporating the solid-state cathodes disclosed herein may be configured, among other parts, with: (i) a thin metal cathode current collector, such as, for instance, 10 μm Al foil (or no such current collector if the cathode is conductive enough along its outside surface to which the positive terminal may be connected); (ii) a solid-state electrolyte, such as, for instance, 1-3 μm thick Lipon; and (iii) a thin metal anode, such as, for instance, 10-50 μm of metallic lithium. One or more elements may be fabricated into the solid-state electrochemical cell by physical vapor deposition (PVD) processing or heat-pressure lamination using readily available Li foil. The elements of the electrochemical cell may be, for example, packaged using a thin-film encapsulation of about 3 μm in thickness. An electrochemical device can have one or more solid-state electrochemical cells.

Figure 3A:
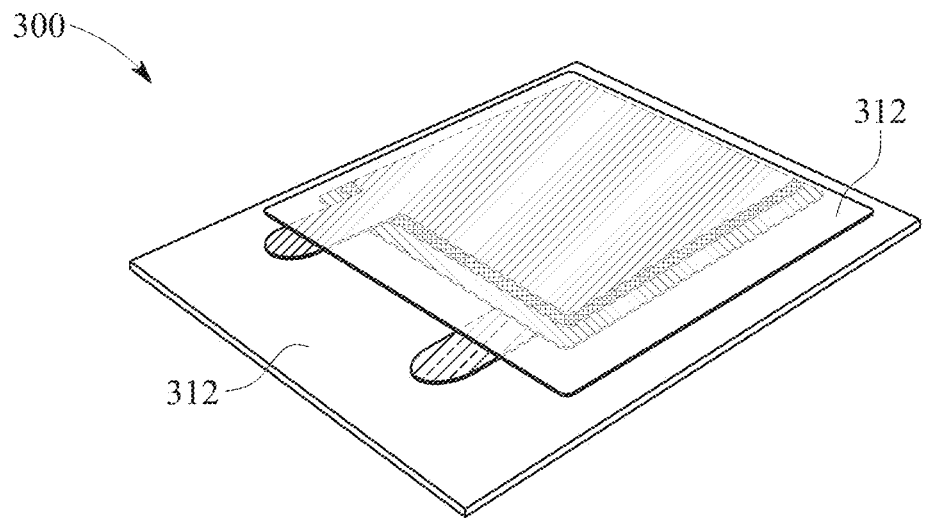
FIG. 3A is a perspective view of a solid-state electrochemical cell in accordance with an embodiment.
Figure 3B:
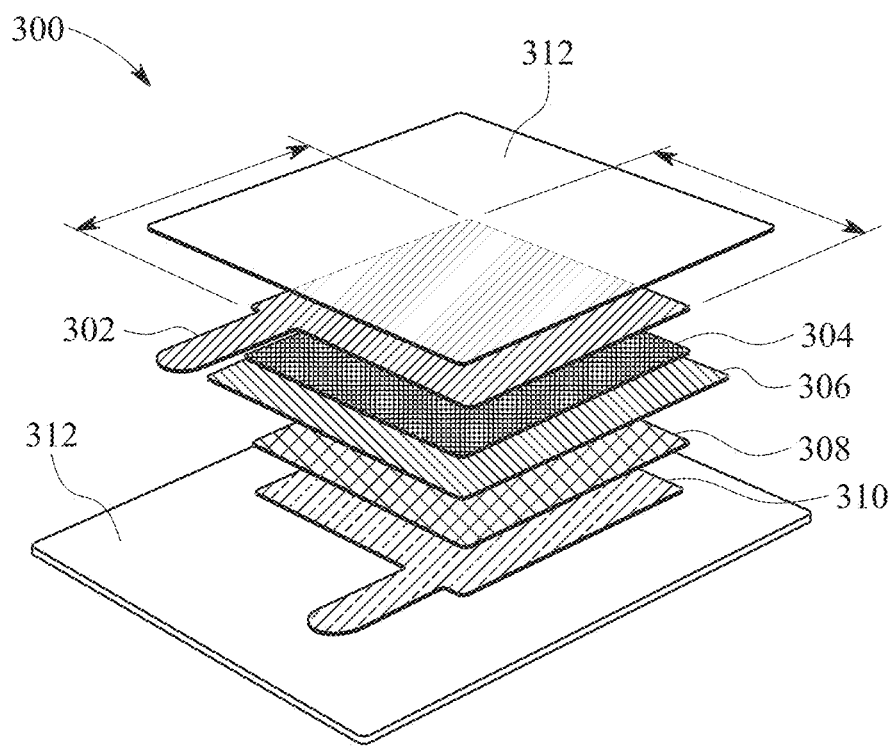
FIG. 3B is an exploded view of the solid-state electrochemical cell of FIG. 3A.

FIG. 3A is a perspective view of an example of an all solid-state electrochemical cell 300 and FIG. 3B is an exploded view of the layers of the all solid-state electrochemical cell 300. The all solid-state electrochemical cell 300 in this example has an anode current collector 302, an anode 304, a solid electrolyte 306, the cathode 308 and, a cathode current collector 310. The layers can be sequentially deposited on the cathode 308. The layers are encapsulated with an encapsulation material 312. The anode material can be lithium metal or alloys including alloys of Si, Sn, Al, Ge, Pb, Bi, and Sb or other lithium compounds; and intercalation host materials, such as a carbon-based material. The solid electrolyte can be, as non-limiting examples, sulfide compounds (e.g. Argyrodite, LGPS, LPS, etc.), garnet structure oxides (e.g. LLZO with various dopants), NASICON-type phosphate glass ceramics (LAGP), oxynitrides (e.g. lithium phosphorus oxynitride or LIPON), and polymers (PEO).

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid-state electrochemical cell, comprising:
   an anode of lithium metal;
   a solid electrolyte;
   a solid-state cathode comprising:
      an electrochemically active cathode material; and
      one or more elemental dopant residing in grain boundaries of the electrochemically active cathode material,
   and the solid-state electrochemical cell does not have liquid and gel materials.

2. The solid-state electrochemical cell of claim 1, wherein the one or more elemental dopant is selected from the group consisting of Zr, Y, Sc, Si, Ti, La, Hf, Nb, Ta, Mo, W, B, Mn, Al, Mg, Cl and F.

3. The solid-state electrochemical cell of claim 1, wherein the grain boundaries contain at least 0.2 wt % of the one or more elemental dopant and the one or more elemental dopant is less than 10 wt % of the solid-state cathode.

4. The solid-state electrochemical cell of claim 1, wherein the grain boundaries contain at least 0.2 wt % of the one or more elemental dopant and the one or more elemental dopant is less than 1.0 wt % of the solid-state cathode.

5. The solid-state electrochemical cell of claim 1, wherein the electrochemically active cathode material comprises one or more lithium transition metal-based particles selected from lithium transition metal oxides and lithium transition metal phosphates.

6. The solid-state electrochemical cell of claim 1, wherein the solid-state cathode is greater than or equal to 85% dense.

7. A solid-state cathode for a solid-state electrochemical cell, comprising:
   an electrochemically active cathode material; and
   one or more elemental dopant residing in grain boundaries of the electrochemically active cathode material, wherein one or more elemental dopant is concentrated in the grain boundaries such that the grain boundaries contain at least 0.2 wt % of the one or more elemental dopant and the one or more elemental dopant is less than 10 wt % of the solid-state cathode, and the solid-state cathode does not have liquid, gel and polymer materials.

8. The solid-state cathode of claim 7, wherein the one or more elemental dopant is selected from the group consisting of Zr, Y, Sc, Si, Ti, La, Hf, Nb, Ta, Mo, W, B, Mn, Al, Mg, Cl and F.

9. The solid-state cathode of claim 7, wherein the one or more elemental dopant is less than 1.0 wt % of the solid-state cathode.

10. The solid-state cathode of claim 7, wherein the electrochemically active cathode material comprises one or more lithium transition metal-based particles selected from lithium transition metal oxides and lithium transition metal phosphates.

11. The solid-state cathode of claim 7, wherein the one or more elemental dopant resides in the grain boundaries between grains of the electrochemically active cathode material and a triple junction defined between three grains of the electrochemically active cathode material.

12. The solid-state cathode of claim 7, wherein the electrochemically active cathode material is LCO and the one or more elemental dopant is Zr, and the solid-state cathode has a purity of 90% or greater.

13. The solid-state electrochemical cell of claim 1, wherein the one or more elemental dopant is selected from the group consisting of Y, Sc, Si, Ti, La, Hf, Nb, Ta, Mo, W, B, Mn, Al, Mg, and Cl.

14. The solid-state electrochemical cell of claim 1, wherein the one or more elemental dopant resides in the grain boundaries between grains of the electrochemically active cathode material and a triple junction defined between three grains of the electrochemically active cathode material.

15. The solid-state electrochemical cell of claim 1, wherein the grain boundaries between grains of the electrochemically active cathode material have a width of between 10 nm and 40 nm.

16. The solid-state electrochemical cell of claim 1, wherein the solid-state cathode is a free-standing wafer on which the solid electrolyte and anode are layered.

* * * * *